Jan. 30, 1968  E. F. ROWEKAMP  3,366,222
FEED CONVEYOR GATE

Filed Oct. 27, 1966  4 Sheets-Sheet 1

INVENTOR.
Edward F. Rowekamp
BY
Wood, Herron & Evans
ATTORNEYS

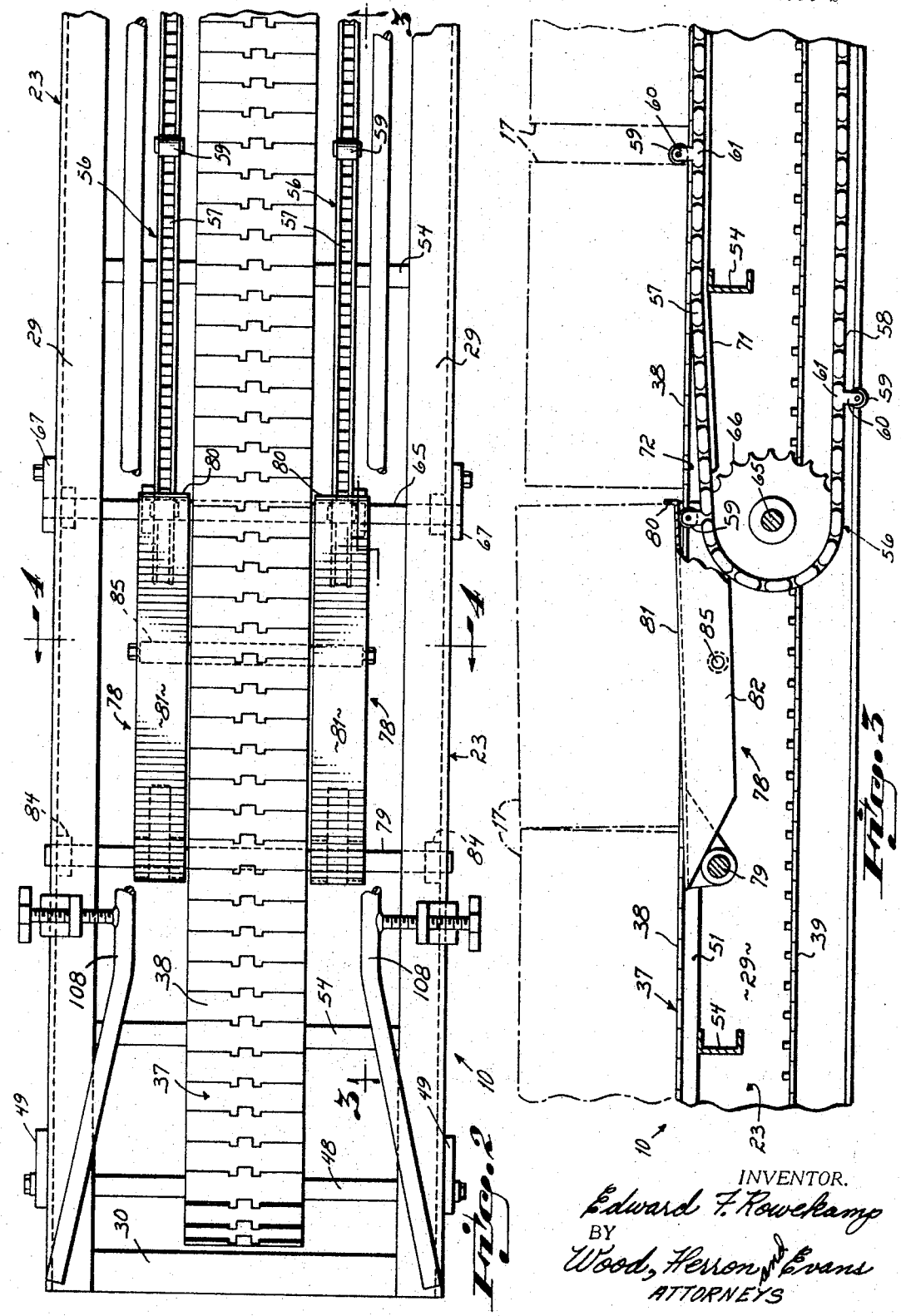

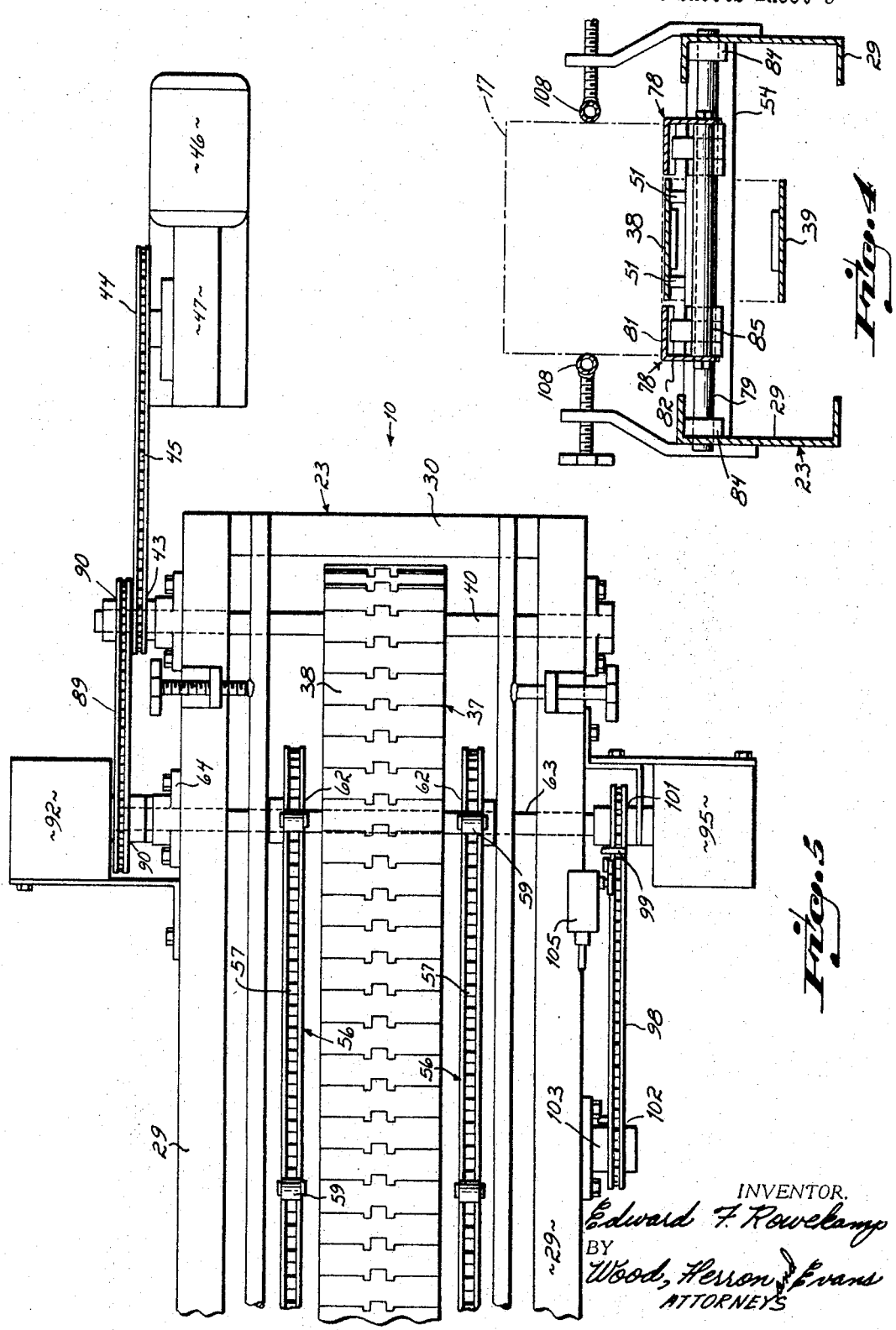

Jan. 30, 1968          E. F. ROWEKAMP          3,366,222
                       FEED CONVEYOR GATE
Filed Oct. 27, 1966                        4 Sheets-Sheet 4
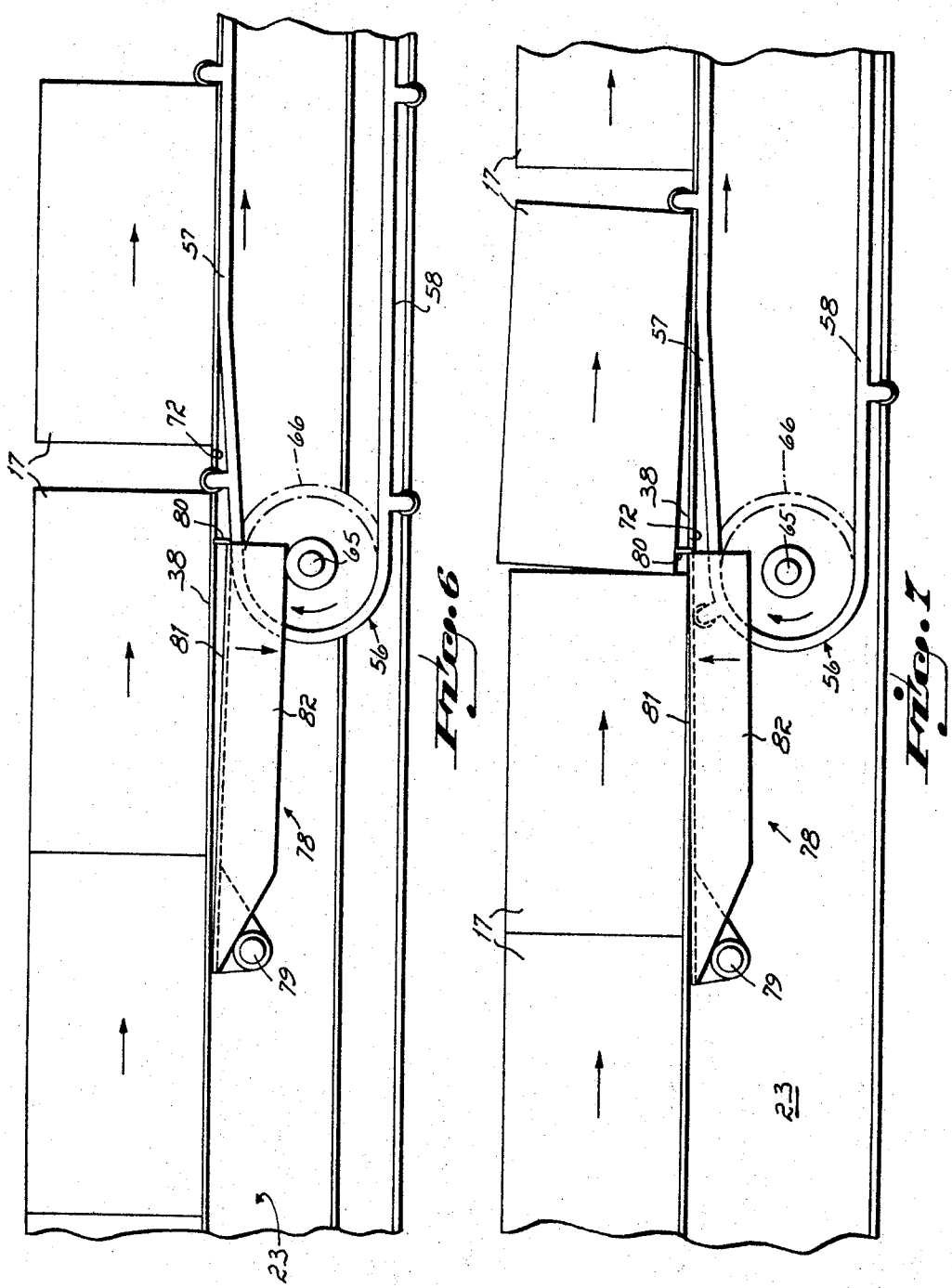
INVENTOR.
Edward F. Rowekamp
BY
Wood, Herron & Evans
ATTORNEYS ID # United States Patent Office 3,366,222
Patented Jan. 30, 1968

3,366,222
FEED CONVEYOR GATE
Edward F. Rowekamp, Cincinnati, Ohio, assignor to The Lodge & Shipley Company, Cincinnati, Ohio, a corporation of Ohio
Filed Oct. 27, 1966, Ser. No. 589,882
8 Claims. (Cl. 198—34)

ABSTRACT OF THE DISCLOSURE

A feed conveyor gate for intermittently gating the movement of articles on a conveyor track that includes, for example, a conveyor track, an indexing arm positioned adjacent the track for movement between positions above and below the track, a stop chain mounted parallel to the track, and a plurality of lugs mounted on the stop chain in spaced relation, the lugs being engageable with the articles carried by the track and being engageable with the indexing arm for effecting intermittent movement of the arm between said positions, thereby intermittently gating the movement of the articles on the track.

---

This invention relates to a gate for the positioning of cases on an endless conveyor track that feeds the cases to a case unloader. More particularly, this invention relates to an improvement in the transfer feed conveyor disclosed in Patent No. 3,185,288.

The apparatus of Patent No. 3,185,288 is used to convey cases of bottles into a case unloader where the bottles are withdrawn from the cases. Once the bottles are removed from the cases they are transferred to a position from which further processing is possible. One of the more efficient case unloading machines presently on the market is one utilizing lift cups of the type disclosed in Myerjohnan, Patent No. 2,695,190 and McHugh, Patent No. 2,873,996. The lifting cups of these patents are attached to a movable head and depend from the head in a gang or group that corresponds to the positions of the bottles in the case. The head may provided with a plurality of the lifting cup gangs, thereby permitting the simultaneous unloading of a number of cases. In operation, the head is lowered until all of the bottles within the case beneath it are engaged by the lifting cups, the necks of the bottles being gripped by the cups. The head is then raised, thereby pulling all of the bottles from the cases, and moved to a position over a conveyor or transfer table where the bottles are released for further processing.

The apparatus of Patent No. 3,185,288, which conveys cases to and positions them under the movable head, includes a pair of endless conveyor tracks with an endless stop chain disposed between the tracks. The stop chain carries a plurality of intermittently spaced stop angles which are positioned to permit, once the stop chain and conveyor tracks stop running, the precise alignment of the bottle cases beneath the case unloader lift cup gangs. A case indexing or feeding mechanism is operatively associated with the conveyor tracks and stop chain to index or feed one case between each pair of stop angles. The case indexing mechanism includes a stop plate, a resilient arm for guiding the cases into temporary engagement with the stop plate, and a spring return, air cylinder actuated pusher plate for pushing successive cases out of engagement with the stop plate and between successive stop angles. The pusher plate is reciprocated transversely to the machine direction of the conveyor and is timed by a suitable timing chain. Thus, because of a fixed or non-slip relationship between the stop chain and the timing chain, the pusher arm will always operate at precisely the proper instant in relation to the movement of the stop angles to insure the thrusting of a case beyond the stop plate between two stop angles.

The indexer of the patent, while performing satisfactorily, is somewhat cumbersome and complex; and it requires a substantial space between cases which it gates on the conveyor. This spacing is directly related to a loss in the efficiency of the apparatus.

The feed conveyor gate of the present invention overcomes certain of the disadvantages of the original structure described above. The gate separates the cases and permits them to move forward in a properly spaced relation on the conveyor track. It comprises at least one indexing arm which is pivotally mounted on a horizontal axis adjacent the track at its trailing or upstream end. The leading or downstream end of the indexing arm overlies the upstream end of the stop chain. The stop chain has a plurality of positioning lugs spaced on the chain and as the lugs on the chain pass under the indexing arm they raise the downstream portion of the indexing arm above the level of the conveyor track so that a carton moving along the track will be elevated slightly above the track. Thus, the carton is stopped from further forward advancement. As the positioning lug moves from beneath the indexing arm, the downstream portion of the gate pivots back below the level of the conveyor track to permit the return of driving engagement of the case with the track. Since the track is moving at a greater speed than the stop chain, the track brings the lowered case forward into engagement with the positioning lug that has just passed, where it remains during the positioning and the unloading of the cases by the case unloader.

The feed conveyor gate of this invention has several advantages over the case indexing mechanism of Patent No. 3,185,288. For example, the cases may be placed in closer alignment, back to front, because the indexing arm of this invention feeds the cases back onto the conveyor track substantially immediately after a positioning lug has passed. Such a space saving, achieved by decreasing the distance required between successive cases, also permits the throughput of the feed conveyor to be substantially increased.

The gate of this invention is also greatly simplified over the case indexing mechanism of Patent No. 3,185,288 in that the timing chains and reciprocator means have been eliminated, the gate being directly timed and operated by the stop chain itself.

Other objectives and advantages of this invention will be more apparent from a detailed description of the invention, taken in conjunction with the accompanying drawings in which:

FIGURE 2 is a top fragmentary view looking down on the conveyor infeed or upstream section and the feed conveyor gate;

FIGURE 3 is a cross-sectional view taken along lines 3—3 of FIGURE 2;

FIGURE 4 is a cross-sectional view taken along lines 4—4 of FIGURE 2;

FIGURE 5 is a fragmentary top view showing the discharge or downstream end of the feed conveyor;

FIGURE 6 is a diagrammatic side view similar to FIGURE 3 showing the engagement of a case with a positioning lug;

FIGURE 7 is a diagrammatic side view similar to FIGURE 6 showing the engagement of a case with a stop tip on an indexing arm.

Figure 1:
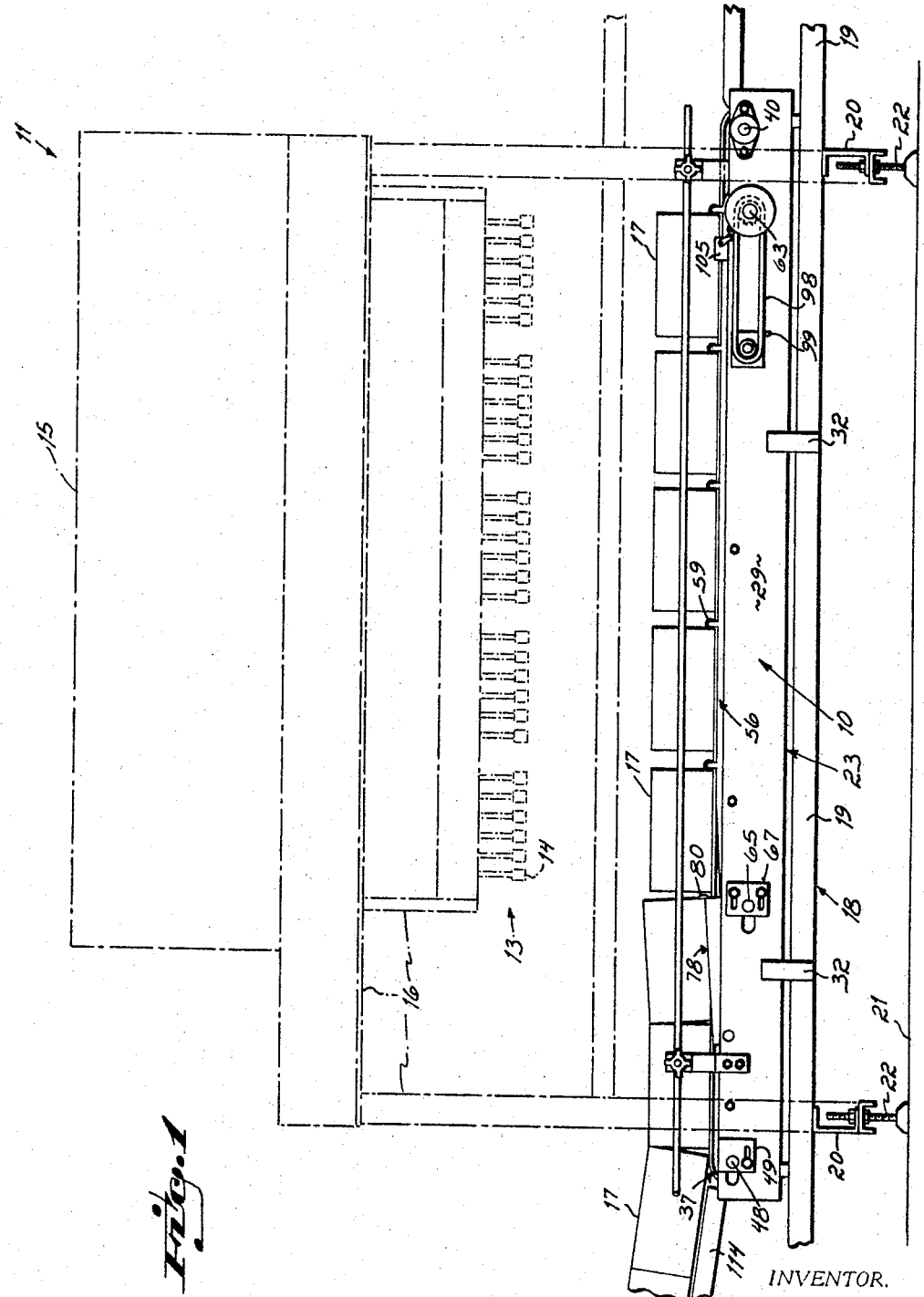
FIGURE 1 is a side view of the transfer feed conveyor of this invention with a case unloader, capable of handling five cases at a time, shown in phantom lines.

In accordance with the principles of the invention, and as best seen from FIGURE 1, the transfer feed conveyor 10 is preferably associated with article transferring apparatus, namely, a case unloader 11 for bottles. The case unloader 11 includes five gangs 13 of lift cups 14 which are operated by mechanism contained in control housing 15. The control housing 15 and lift cup gangs 13 are supported by a suitable framework 16. When five cartons or cases 17 of bottles are positioned below the gangs 13 of lift cups 14 the cups descend onto the bottles within the cases, grip the bottles by the neck or head, and then lift them out of the carton and transfer them to an unloading position where they are released for further processing. The unloading apparatus is the subject of Patent Nos. 2,695,190 and 2,873,996 and does not need to be described in detail here.

The transfer feed conveyor 10 of this invention is carried on a base frame 18 that includes a pair of longitudinal beams 19 held in alignment by cross channels 20. The base frame 18 is mounted to the floor 21 by means of leveling screws 22, see FIGURE 1.

The feed conveyor 10 is mounted upon the base frame 18 and includes a main support frame 23 formed from a pair of parallel channel beams 29 that are joined at their ends by cross bars 30, see FIGURES 2 and 5. The main support frame 23 is mounted to the base frame 18 by flat plates 32.

Referring to FIGURES 2 and 5, an endless conveyor track 37 having an upper flight 38 and a lower flight 39 is positioned within the main frame 23. The conveyor track 37 is driven at its downstream end by means of a track drive shaft 40 that is journalled to the channel beams 29. The drive shaft 40 carries a drive sprocket 43. A drive motor 46 is connected to motor sprocket 44 through a gear reducer 47 and the motor drives the drive shaft through drive chain 45 which passes over sprockets 43 and 44. Thus, the endless conveyor track 37 is driven by motor 46.

The upstream end of the conveyor track 37, see FIGURE 2, is carried by a track idler shaft 48 that is journalled by bearing plates 49 to the main frame 23. The bearing plates 49 are adjustable in the machine direction of the conveyor 10 so that the operating tension or tautness of the conveyor track 37 may be adjusted.

Spaced support bars 54, mounted transverse to the conveyor upper flight 38, see FIGURES 2 and 3, are provided for mounting a guide bar 51 substantially the entire length of the upper flight 38. The guide bar 51 keeps the upper flight 38 of the conveyor track 37 substantially level, that is, prevents sag, when it is carrying filled cartons or cases.

A stop chain 56 (FIGURES 2 and 3) having an upper flight 57 and a lower flight 58 is located on each side of the track 37. Each stop chain carries a plurality of spaced positioning lugs 59. Preferably, the lugs 59 are in the form of rollers. The lugs or rollers 59 are mounted to the stop chain 56 by mounting plates 60 that are integral with links 61 of the chain. The lugs 59 are mounted at such spaced intervals on the stop chain 56 as to permit the cases to be precisely positioned beneath the lift cup gangs 13 when the conveyor 10 is in operation.

The endless stop chains 56 engage chain drive sprockets 62 at the downstream end of their travel length, see FIGURE 5, and these sprockets are mounted on a chain drive shaft 63 which is journalled to the main support frame 23 by bearing blocks 64. The upstream ends of the stop chains 56 are carried by a chain idler shaft 65 and sprockets 66, see FIGURES 2 and 3, the shaft 65 being journalled to the main frame 23 by bearing plates 67. The bearing plates 67 are adjustable in the machine direction of the conveyor 10 so that the operating tension or tautness of the conveyor track may be adjusted.

A chain support strip 71 (FIGURE 3), angulated at its upstream end, is mounted to transverse support bars 54 beneath each upper flight 57 of each stop chain 56 to maintain the level running position of the stop chain upper flight, that is, to prevent the positioning rollers 59 mounted on the stop chain upper flight from being depressed beneath the top surface 72 of the endless conveyor track. If the rollers 59 were permitted to drop below the top surface 72 of the conveyor track 37 the cases 17 would not remain precisely positioned on the track.

A pair of indexing arms 78 (FIGURES 2 and 3), one positioned adjacent either side of the endless conveyor track 37 at its upstream or infeed end, provide the primary structural portions of the improved case indexing mechanism. Each indexing arm 78 has a runner or top plate 81, a depending side or flange 82, and an upwardly flaring stop tip 80. The indexing arms 78 are fixed to a common shaft 79 by a collar formed integrally with the arms, and the shaft is pivotally mounted to the main frame 23 by bearing plates 84. The indexing arms 78 are interconnected by a spacer pin 85 that is bolted at each end to an indexing arm 78, thereby maintaining the arms in alignment and providing increased structural rigidity. The indexing arms 78 are of such length and are positioned so that they overlie the stop chains 56 to an extent which permits the positioning rollers 59 to intermittently contact and raise the front portion or downstream end of the indexing arms as the rollers sweep around the upstream stop chain sprockets 66.

The stop chains 56 (FIGURE 5) are driven from the same motor 46 as drives the endless conveyor track 38. The conveyor drive shaft 40 and chain drive shaft 63 are interconnected by a connector chain 89 which cooperates with a chain sprocket 90 mounted on each of the shafts. The stop chains 56 and the conveyor track 37 are made to travel at different speeds by varying the sizes of the sprockets 90.

The transfer feed conveyor is also provided with timing and stopping means which permits the stop chain 56 and, hence, the positioning rollers 59, to be precisely stopped with reference to the lift cup gangs 13 so that cases 17 carried on the feed conveyor may be accurately positioned, time after time, underneath the gangs, see FIGURE 5. The forward movement of the stop chains 56 and, hence, of the drive shaft 63, is controlled by a clutch 92 connected to one end of the shaft 63 and mounted on the main frame 23. A brake 95 is connected to the other end of the stop chain drive shaft 63 and is also mounted on the main frame 23. An endless timing chain 98, carrying two timing lugs 99, is mounted on the chain drive shaft 63 by a timing sprocket 101. The timing chain 98 also passes around an idler sprocket 102 that is journalled to the main frame 23 by an idler shaft and plate 103. The timing chain 98 is positioned close enough to the side channel 29 so that the lugs 99 on the chain can cooperate with a limit switch 105 mounted on the side channel. Thus, through cooperation of the brake 95, clutch 92 and timing chain 98, the stop chain 56 may be stopped at precise, predetermined positions. When the stop chain 56 stops the endless conveyor track 37 continues to run to insure that the cases 17 are abutted against the positioning rollers 59 when they are stopped, thereby effectively eliminating any rebound of the cases from the positioning rollers.

An adjustable side guide rail 108, see FIGURES 2 and 4, is provided on each side of the conveyor to insure centering of the cases 17 with respect to the stop chains 56 and endless conveyor track 37, no matter what width cases are being processed. The guide rails 108 extend the length of the conveyor track. Preferably, the side guide rails 108 are outwardly flared at the infeed or upstream end of the conveyor to aid in initial alignment of the cases 17 on the conveyor and to prevent jam ups of the cases as they initially contact the endless conveyor track 37.

In operation, the cases 17 are supplied by a skate wheel type conveyor 114 to the conveyor track 37 with the conveyor 114 being inclined downwardly toward the endless conveyor track 37. As best seen from FIGURES 1, 6 and 7, the cases 17 initially contact the endless conveyor track 37 and are moved downstream on the upper flight 38 of the track. The cases 17 must be transferred from their abutting relationship, such as they are when on the skate roller conveyor 114 and the infeed portion of the track 37, to a predetermined space relationship where gaps are present between the cases so that they may be precisely positioned beneath the lift cup gangs 13. Such a spacing relationship is predetermined by the location of the positioning rollers 59 on the endless stop chain 56. Thus, each individual case 17 must be located between two positioning rollers 59.

As seen from FIGURE 6, the feed conveyor gate indexes or feeds each individual case 17 between a pair of positioning rollers 59. As a first case 17 travels downstream on the endless conveyor track 37 it passes over the indexing arms 78, which are positioned beneath the conveyor track upper flight surface, into engagement with a pair of transversely aligned positioning rollers 59, one on each stop chain upper flight. The rollers 59 at this point are just beginning their downstream run. As the stop chains' upper flights 57 continue to move downstream, the front of the following or second case 17 in line continues to abut the rear of the first case that has just engaged the transversely aligned positioning rollers 59.

As best seen from FIGURE 7, when the next or following pair of positioning rollers 59 sweeps around the stop chain idler sprockets 66 from the lower flight 58 toward the upper flight 57, each roller engages the underside of one indexing arm runner 81. As the following pair of stop rollers 59 engage the undersides of the indexing arm runners 81 the downstream or front portion of each of the arms is raised above the upper flight 38 of the endless conveyor track 37, thereby also raising the stop tips 80 above the upper flight. Thus, as the first pair of positioning rollers 59 continue to move downstream the following pair of positioning rollers cause the indexing arm 78 to rise or pivot above the upper flight 38 so that the following case 17 is brought into engagement with, and stopped from further movement by, the stop tips 80. Subsequently, as the following positioning rollers 59 are moved out from underneath the indexing arm runners 81, the indexing arms 78 drop or pivot back beneath the upper flight 38 of the endless conveyor track 37, thereby permitting the case to drop into operable engagement with the conveyor track and move into engagement with the positioning rollers 59. The cases 17 are always maintained in abutting relationship with the rollers 59 because the conveyor track 37 runs at a speed greater than the stop chains 56. Thus, because the indexing arms 78 are raised and lowered by virtue of their cooperation with the stop chain positioning rollers 59, the indexing arms always index at precisely the proper instant to insure the positioning of a case between the rollers.

When five cases have been transported to positions immediately below the unloading apparatus, the stop chains 56 and, therefore the positioning rollers 59, are stopped in operating alignment with the lift cup gangs 13. The stop chains 56 are stopped at the precisely predetermined position because the limit switch 105 has been tripped by the timing lug 99 carried by the timing chain 98. When the limit switch 105 is tripped the brake 95 is immediately activated to stop forward movement of the stop chain. As the stop chains 56 are braked the clutch 92 is disengaged, thereby permitting the conveyor or track drive shaft 40 to continue rotating. That is, because the conveyor track drive shaft 40 and stop chain drive shaft 63 are interconnected by connector chain 89, the clutch 92 has been provided to permit the track shaft 40 to rotate when the chain shaft 63 is not rotating. Such continued rotation of the conveyor track drive shaft 40 permits the conveyor track 37 to keep running when the stop chains 56 are stopped, thereby insuring intimate abutting engagement of the leading or front faces of the cartons with the positioning rollers 59 while the cases are beneath the lifting cup gangs 13. Thus, the cases 17 are precisely positioned beneath the lifting cup gangs 13 while they are being unloaded.

Having completely and fully described my invention, what I desire to claim and protect by Letters Patent is:

1. A conveyor comprising
a conveyor track for conveying articles,
at least one stop chain mounted parallel to said conveyor track,
a plurality of lugs mounted on said stop chain in spaced relation, said lugs being engageable by the articles carried by said track, and
at least one indexing arm mounted adjacent said conveyor track for movement between positions above and below said track, said indexing arm being mounted so that said lugs can actuate said arm, thereby intermittently raising said indexing arm from beneath to above said track.

2. A conveyor as set forth in claim 1 wherein said indexing arm is mounted so that said lugs can intermittently engage and disengage said arm.

3. A conveyor as set forth in claim 1 including
a stop tip mounted on said indexing arm for restraining the movement of the articles on said track when said arm is raised above said upper track flight.

4. A conveyor comprising
an endless conveyor track, said track having an upper flight for conveying articles,
at least one endless stop chain mounted parallel to said conveyor track, said chain having an upper flight at approximately the same level as said track upper flight,
a plurality of positioning lugs mounted on said stop chain in spaced relation, said lugs of said chain upper flight projecting above said track upper flight and being engageable by the articles carried by said track upper flight, and
at least one indexing arm positioned in the path of said lugs for movement between positions above and below said track upper flight, said indexing arm movement being effected by the engagement of said lugs with said indexing arm,
whereby the articles are intermittently gated by said positioning lugs and are disposed on said conveyor track adjacent its positioning lugs.

5. A conveyor as set forth in claim 4 wherein said indexing arm is pivotally mounted adjacent and beneath said track upper flight.

6. A conveyor as set forth in claim 4 wherein said positioning lugs comprise freely rotating rollers.

7. A conveyor as set forth in claim 4 including
drive means for driving said conveyor track and stop chain in the same direction, and
clutch and brake means connected to said drive means for selectively stopping said stop chain while permitting said conveyor track to continue running, thereby insuring an abutting relationship between the articles and said positioning lugs when said stop chain is halted.

8. A conveyor as set forth in claim 7 wherein
said conveyor track upper flight extends further upstream than does said stop chain upper flight, and
said drive means drives said conveyor track at a faster speed than said stop chain, thereby also insuring an abutting relationship between the articles when feeding the articles to said indexing arms.

References Cited

UNITED STATES PATENTS 2,731,130 1/1956 Blickenderfer ____ 198—34
2,840,223 6/1958 Schoppee ____ 198—34
3,080,042 3/1963 Sherman ____ 198—34

FOREIGN PATENTS 30,785 11/1959 Finland.

EDWARD A. SROKA, *Primary Examiner.*